US008025272B2

(12) United States Patent
Schallmeier

(10) Patent No.: US 8,025,272 B2
(45) Date of Patent: Sep. 27, 2011

(54) AIR SPRING AND DAMPER UNIT HAVING A PILOT-CONTROLLED MAIN VALVE

(75) Inventor: Christian Schallmeier, Hannover (DE)

(73) Assignee: Continental Aktiengesellschaft, Hannover (DE)

( * ) Notice: Subject to any disclaimer, the term of this patent is extended or adjusted under 35 U.S.C. 154(b) by 544 days.

(21) Appl. No.: 12/097,590

(22) PCT Filed: Nov. 7, 2006

(86) PCT No.: PCT/EP2006/010622
§ 371 (c)(1),
(2), (4) Date: Jun. 18, 2008

(87) PCT Pub. No.: WO2007/068312
PCT Pub. Date: Jun. 21, 2007

(65) Prior Publication Data
US 2008/0308367 A1 Dec. 18, 2008

(30) Foreign Application Priority Data
Dec. 17, 2005 (DE) .................. 10 2005 060 581

(51) Int. Cl.
*F16F 9/04* (2006.01)
(52) U.S. Cl. ............. 267/64.21; 267/64.25; 188/322.15; 188/322.22
(58) Field of Classification Search .............. 188/282.1, 188/282.2, 282.3, 282.4, 316, 317, 322.13, 188/322.15, 322.22; 267/64.11, 64.15, 64.18, 267/64.19, 64.21–27
See application file for complete search history.

(56) References Cited

U.S. PATENT DOCUMENTS

| | | | | |
|---|---|---|---|---|
| 3,046,003 A * | 7/1962 | Schultz | ...................... | 267/64.24 |
| 3,662,649 A * | 5/1972 | Williams | ..................... | 89/40.11 |
| 3,880,446 A | 4/1975 | Muller | | |
| 4,648,490 A * | 3/1987 | Bergloff | ........................ | 188/297 |
| 4,669,710 A | 6/1987 | Horvat | | |
| 4,880,086 A * | 11/1989 | Knecht et al. | .............. | 188/266.6 |
| 5,078,240 A * | 1/1992 | Ackermann et al. | .......... | 188/285 |
| 5,143,185 A | 9/1992 | Klein et al. | | |
| 5,244,063 A * | 9/1993 | Laurien et al. | ............. | 188/282.3 |
| 5,303,804 A * | 4/1994 | Spiess | ........................ | 188/266.5 |
| 5,392,883 A * | 2/1995 | Huang et al. | ............... | 188/282.3 |
| 5,454,452 A * | 10/1995 | Ohlin | ........................ | 188/266.5 |
| 5,850,896 A * | 12/1998 | Tanaka | ....................... | 188/266.2 |
| 5,927,449 A * | 7/1999 | Huang et al. | ............... | 188/282.2 |
| 7,213,799 B2 * | 5/2007 | Behmenburg et al. | ..... | 267/64.24 |
| 2005/0167216 A1* | 8/2005 | Park | ......................... | 188/282.3 |

FOREIGN PATENT DOCUMENTS

| | | |
|---|---|---|
| DE | 4334007 | 4/1995 |
| DE | 199 32 717 A1 | 1/2001 |
| DE | 10115980 | 10/2002 |
| DE | 10135261 C1 | 10/2002 |
| DE | 10311263 B3 * | 7/2004 |
| EP | 1729030 | 12/2006 |
| GB | 2272499 | 5/1994 |

* cited by examiner

*Primary Examiner* — Bradley King
*Assistant Examiner* — Nicholas J Lane
(74) *Attorney, Agent, or Firm* — Brinks Hofer Gilson & Lione

(57) ABSTRACT

An air spring and damper unit for vehicles has, as operating spaces, at least two pressure spaces filled with compressed air and connected to one another via flow channels. The pressure spaces have movable walls in the form of rolling bellows or folding bellows, wherein a pilot-controlled main valve which can be loaded with a control pressure on the low-pressure side is configured at least in one flow direction in a first flow channel.

5 Claims, 7 Drawing Sheets

AIR SPRING AND DAMPER UNIT HAVING A PILOT-CONTROLLED MAIN VALVE

BACKGROUND OF THE INVENTION

The invention relates to an air spring and damper unit for vehicles, which has at least two working spaces filled with compressed air, in which at least one working space is in each case delimited at least partially by movable walls, in particular by movable walls in the form of roll-type or fold-type bellows, and in which the working spaces are connected to one another via flow ducts, and the flow ducts have throttle valves.

Such air spring and damper units, referred to in brief as air dampers, are known as convenient spring/damper units for the most diverse possible vehicle types, such a damper unit usually being arranged between the body and the chassis.

Thus, DE 101 15 980 discloses a gas spring/damper unit with a piston which is displaceable in a cylinder housing and is sealed off with respect to the latter and which subdivides two working spaces. The damper space is partially delimited outwardly by a roll-type bellows. The throttle valves located in the piston are in this case configured such that, as a function of the throughflow direction, a different flow resistance is present and the location of transfer from a laminar to a turbulent flow is adapted. The throttle valves shown here are permanently set/integrally formed throttles without a regulating function.

DE 199 32 717 A1 discloses a device in which two working spaces of a gas spring/damper unit are subdivided by means of a sealed-off piston displaceable in a cylinder housing. The damper space is partially delimited outwardly by a roll-type bellows. The throttle valves located in the piston are in this case configured as valves loaded by spring washers, the spring washers and valve cross sections being designed as a function of the throughflow direction.

A pneumatic spring/damper unit with electromagnetically controllable overflow valves, the closing members of which are formed by small diaphragms, is known from DE 43 34 007 A1. The magnetic flux runs through the small diaphragms, and the small diaphragms cooperate, in their closing position, with assigned bearing surfaces. The closing force can be varied by means of a controllable electromagnet, so that a spring/damper unit with variable tuning is obtained. With this spring/damper unit, it is possible to set the maximum closing force or prestress and to determine the pressure beyond which the valve opens.

A gas spring/damper unit with overflow throttles which are closed by means of resilient sealing disks is known from DE 101 35 261 C1. The resilient sealing disks are not permanently tension-mounted, but are secured only for a predetermined pressure difference range by means of a spring force. After a specific pressure has been overshot, the tension-mounting region lifts off, the resilient force for loading the sealing disk being applied preferably by means of a likewise resilient annular disk.

The previous embodiments have the disadvantage, however, that a possibility of adjusting the damper characteristic as a function of the respective driving situation with the effect of a changeover of the air dampers to another damping characteristic curve either is present to only a slight extent or is not afforded at all. The dynamic differential pressure at the throttle valves and the volume flow are critical for energy conversion by dissipation and consequently for the damping work. In air damping, high pressures and large volume flows are necessary for generating the required damping work. Influencing the damper characteristic, that is to say the damping characteristic curve, is therefore difficult particularly because, in the gas damping systems present here, high pressures and high volume flows have to be switched.

For the invention, therefore, the object was to provide an air spring and damper unit for vehicles, in which a good adjustability of the damper characteristic is achieved, in which high pressure differences can be switched, in addition to large volume flows, between the working chambers, and which allows adaptation and reaction to different ground and driving situations.

The object is achieved by means of the features of the main claim. Advantageous developments are disclosed in the subclaims.

SUMMARY OF THE INVENTION

According to the present invention, a throttle valve of controllable damping is arranged in a first flow duct at least in one flow direction and is designed as a pilot-controlled main valve which opens toward the low-pressure side and which can be acted upon on the low-pressure side with a control pressure. To regulate the control pressure, a control valve is arranged on the low-pressure side in a second flow duct such that the main valve and the control valve delimit a third pressure space for the control pressure.

In contrast to the air damping systems known from the prior art and mentioned above, in which, for example by means of controllable electromagnets, the closing force is varied by the proportional, but direct action of an additional force (magnetic force) on the valve body or on the springs, in the version according to the invention an indirect action on the closing and damping characteristic of a valve is carried out by influencing or controlling the pilot control force or the pilot control pressure.

As is known, in hydraulic valves, higher switching forces can be achieved by means of pilot control. This takes place in that the system pressure of an incompressible medium is utilized in order to compensate the switching forces with the exception of a slight differential force. In this case, for example, differential surfaces operatively connected to one another are formed on the switching pistons/switching valves. In the known pilot controls of hydraulic systems, however, pilot control takes place, as a rule, on the high-pressure side, that is to say the system pressure prevailing on the high-pressure side is used for assisting the switching operation.

By contrast, in the version according to the invention, the regulation of valve flows in a compressible medium, to be precise the regulation of a pneumatic throttle valve for air dampers, takes place by means of a pilot control arranged on the low-pressure side. As stated above, this low-pressure side pilot control is distinguished in that the pilot control force, as such, can be set or is regulated. This is carried out by means of a pilot control valve which is arranged on the low-pressure side in a second flow duct and which basically acts on the airflow in the same way as an adjustable throttle. By means of this "adjustable throttle", a control pressure is generated in a third pressure space located toward the low-pressure side and delimited by the main valve and control valve, that is to say an "intermediate region" between the two working spaces. The lower limit of the control pressure is then the system pressure on the low-pressure side, with the control valve fully open, and the upper limit is the system pressure on the high-pressure side, with the control valve fully closed. The third pressure space may in this instance constitute basically a connecting duct between the control valve and main valve, if appropriate widened by means of a bore for guiding the main valve.

Such a design with a passive, but pilot-controlled, main valve and with a control valve/pilot control valve arranged in this way for the control pressure affords an excellent characteristic map, regulatable in fine steps, for the air spring and damper unit. Between the "hard" and the "soft" extreme values of the damping of such a characteristic map, an outstanding covering of the intermediate region is possible in this instance, depending on the driving state. When the air spring and damper unit is used as chassis springing and damping in passenger cars, for example, driving states, such as emergency braking, cornering, rolling or rocking, can best be assisted for an optimization of the driving state by means of an exact damper setting within a widely spread characteristic map.

According to an advantageous design, a permanently set uncontrolled throttle valve is arranged in a parallel third flow duct. This gives rise to a permanently set hard damping characteristic in a throttle valve of a flow duct connected in parallel with the respective flow direction in the tension or compression stage, this hard damping characteristic being maintained as long as the main valve in the first flow duct does not open, that is to say as long as the pilot control is not cut in. This results not only in a reliable fallback level, for example for a power failure, but also in a "hard" safety setting which is simple to switch.

According to a further advantageous design, the second flow duct runs at least partially inside the first flow duct. This affords a particularly integrated and compact type of construction.

According to a further advantageous design, the control valve for the control pressure is designed as a slide, the closing or movement direction of which is oriented essentially perpendicularly to the flow direction in the influenced flow duct. Such a design reduces and equalizes the required actuating forces for the control valve considerably. As a result, even relatively small servomotors with relatively low powers can be used, which then again reduces the power consumption for the actuating movements.

According to a further advantageous design, the main valve in the first flow duct and the throttle valve in the third flow duct are designed as spring-loaded valves. With this very simple construction, valves are possible which have a valve body and, as a valve spring, a helical spring acting on the valve body counter to the opening direction of the latter, but also cup or washer springs in which the spring washer itself is the valve body and can be bent up resiliently, for example, at its edges. Combinations are likewise possible, or valves in which the spring loading takes place, for example, by the compression of a compressible medium acting on a valve body.

According to a further advantageous design, a spring-loaded non-return valve, which opens toward the low-pressure side, is arranged in the second flow duct on the high-pressure side. This ensures that, with the control valve closed, pressure equalization takes place out of the high-pressure side into the third pressure space. The main valve opening toward the low-pressure side and acted upon on the low-pressure side by the control pressure is consequently acted upon with the same medium pressure on the front side and on the rear side and remains closed. With the control valve closed and with a correspondingly designed spring characteristic of the main valve, this in a simple way safeguards the fallback position in which a hard and permanently set damping characteristic takes effect in a throttle valve of the third flow duct.

According to a further advantageous design, the spring-loaded non-return valve in the second flow duct is arranged inside the spring-loaded main valve in the first flow duct. By means of such "valve nesting", the construction size and the machining of the various flow ducts and valve seats during production are reduced.

According to a further advantageous design, a fourth flow duct is designed as a throttled bypass. This gives rise, particularly in the case of adjustable throttling, to the further possibility of an approximate presetting of the damper hardness. The fourth flow duct then advantageously runs at least partially inside the third flow duct. This, too, serves for combining the components and for reducing the construction size. The throttled bypass may then also be implemented by means of gap diaphragms, if appropriate even, for example, via tolerances in the manufacture of the valve seat of the third throttle valve.

According to a further advantageous design, the four flow ducts, together with their valve and throttle devices, are designed in a functionally identical way in both flow directions. This affords a possibility of controlling both flow directions, to be precise the compression stage and the tension stage of the damper unit. As a result, inter alia, build-up oscillations can be reduced in the best possible way.

According to a further advantageous design, the two working spaces are separated by a rotationally symmetrical piston axially movable inside a rotationally symmetrical housing and located at the head end of a piston rod, so that one working space is arranged on the piston front side and at least the other working space is arranged on the piston rear side. The overall air spring and damper unit then requires little construction space, in particular no remotely lying additional equalizing spaces connected to lines. The construction size is advantageously reduced to a minimum when the flow ducts additionally run inside the movable piston.

According to a particularly advantageous design, in this case, four flow ducts, which run partially one in the other or along the same paths, are provided for each flow direction inside the movable piston in functional terms. Thus, the first flow duct in each case has a pilot-controlled main valve consisting of a valve body loaded by a spring, and the axis and movement direction of the valve body and of the spring of the main valve are arranged perpendicularly to the piston axis. Thus, the second flow duct in each case runs partially inside the first flow duct and has a spring-loaded non-return valve which is arranged inside the valve body of the main valve. The axis and movement direction of the non-return valve are likewise arranged perpendicularly to the piston axis and coaxially to the main valve. The control valve is in this instance designed as an electrically driven slide, and the drive of the control valve lies with its axis and direction of action perpendicularly to the piston axis and parallel to or in the axial direction of the main valve.

A particularly compact type of construction and consequently a minimization of the demand for installation space in the vehicle are thereby achieved. This may be further increased in that the main valve, the control valve and the drive of the control valve lie along an axis, and these axes for the tension stage and for the compression stage are arranged parallel and one above the other in the piston.

According to a further advantageous design, in this case, the slide geometry of the control valve is designed such that the cross section to be opened by the control valve changes nonlinearly in its cross-sectional area, to be precise increases nonlinearly during the opening of the slide and decreases nonlinearly during the closing of the latter. This counteracts the proportional opening characteristic usually present in electromagnetic drives. Since the change in the flow conditions (damping throttle flow) is not per se proportional to the change in a duct cross section, the proportional opening characteristic of electromagnetic drives leads to a nonlinear ratio of pressure difference to opening cross section and consequently to jumps in the characteristic curves of the characteristic map. This can be prevented in an elegant way by the advantageous slide geometry, so that a uniform gradation of the characteristic curves in the characteristic map is achieved. This behavior can be achieved in a simple way by means of a configuration of the control valve slide such that the control valve is designed as a flat slide which influences the cross section of a flow duct and the front side of which is provided with stepped and beveled setbacks.

Of course, it is also possible, as before, to provide a linear change in the cross section to be opened by means of a simply designed, for example rectangular, control valve slide if the "smooth" opening of the main valve achieved by means of the low-pressure side pilot control affords a sufficient gradation of the characteristic map.

The invention will be explained in more detail by means of an exemplary embodiment. What is shown here is a "triple-bellows damper", as it is known, in which the two working spaces are delimited at least partially by roll-type bellows. It will be appreciated that any other air spring/damper unit, that is to say, for example, one with separate equalizing spaces as working spaces or one which has only rigid pistons and cylinder constructions, may likewise be designed with the features according to the invention.

DETAILED DESCRIPTION OF THE DRAWINGS

Figure 1:
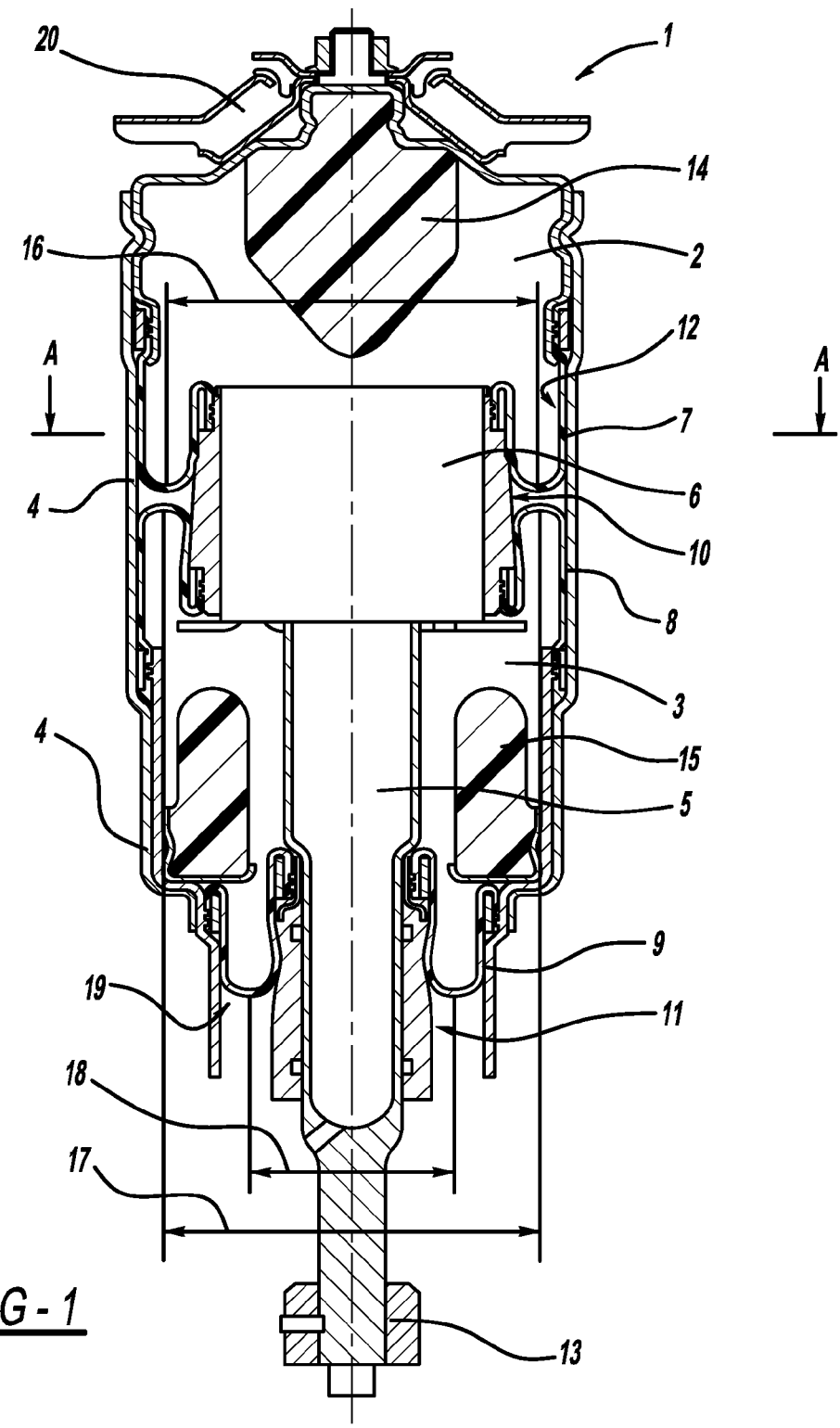
FIG. 1 shows an air spring and damper unit according to the invention in a triple-bellows version for a chassis of an air-sprung passenger car.

FIG. 1 shows a triple-bellows air spring and damper unit 1 according to the invention for the chassis of an air-sprung passenger car. The air spring and damper unit has two working spaces 2 and 3 filled with compressed air. The compressed air is conveyed into the working spaces in a known way by way of a compressor, not illustrated in any more detail here, via associated valves and lines and can likewise be discharged via this system. Conventionally, an air spring or leveling system consists of a compressed air installation/compressed air supply and of four air spring modules, to be precise one for each wheel, and is regulated, overall, via a control device.

The working spaces 2 and 3 are arranged in a common pot-shaped, here cylindrically designed, housing 4 and are separated by a rotationally symmetrically designed piston 6 located at the head end of the piston rod 5.

The piston 6 is axially movable inside the cylindrical housing 4. The flow ducts, illustrated in more detail later and connecting the working spaces, are arranged inside the piston 6, in each case at least four flow ducts, such as are described later, being present in each flow direction.

The piston 6 and the piston rod 5 are in each case sealed off and guided inside the cylindrical housing by means of roll-type bellows 7, 8 and 9. The outer faces 10 and 11 of the piston and of the piston rod and also the inner face 12 of the cylinder are in each case designed as rotationally symmetrical rolling contours over a region required for the rolling of the roll-type bellows.

A fold-type bellows usually located between the end of the cylindrical housing and the lower connection point 13 with the chassis and intended for protection against surrounding influences is not illustrated in any more detail here.

Furthermore, the air spring and damper unit has resiliently designed stops 14 and 15 which, under corresponding load, delimit the piston travel/spring travel in the compression stage end position or in the tension stage end position, so that no metallic contact occurs.

The outer face of the rotationally symmetrical piston 6 is designed as an upwardly tapering cone envelope. As a result, the first roll-type bellows 7 and the second roll-type bellows 8 have different active diameters 16 and 17 which in each case are larger than the active diameter 18 of the third roll-type bellows 9 which forms the rolling fold 19. The active diameter 16 of the first roll-type bellows is smaller than the active diameter 17 of the second roll-type bellows. The different active diameters 16 and 17 give rise to a differential surface (annular surface) which generates a force acting on the piston. This differential force, not to be dealt with any further here, is generated, via the piston faces, in cooperation with the active diameter 18 of the roll-type bellows 9.

On the body side, the air spring and damper unit is connected to the vehicle in a known way via a spring strut head bearing 20.

Figure 2:
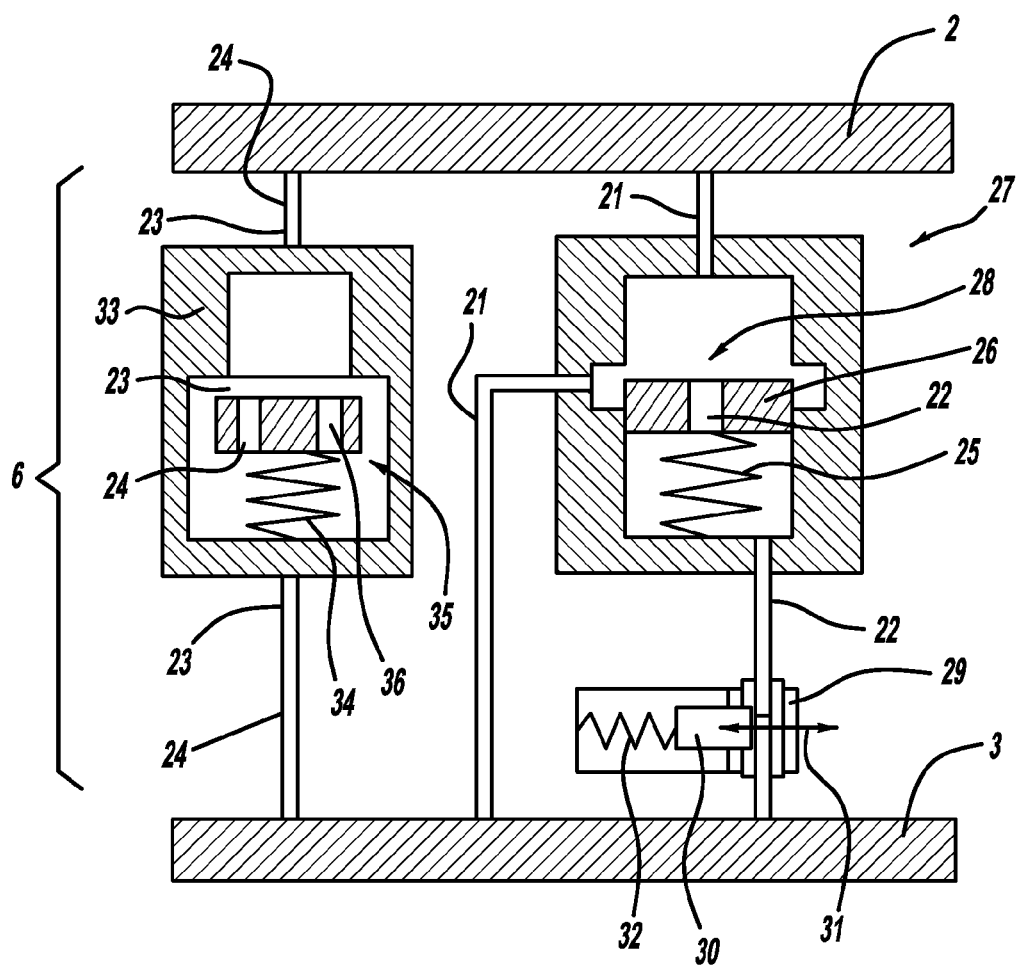
FIG. 2 shows a basic illustration of the flow ducts arranged in the piston of an air spring and damper unit according to the invention.

FIG. 2, then, shows a basic and functional illustration of the flow ducts, throttles, valves and functions arranged in the piston of an air spring and damper unit according to the invention. In this instance, the momentarily high-pressure side working space 2 of the air spring and damper unit can be seen at the top, whereas the momentarily low-pressure side working space 3 can be seen in the lower region. The flow ducts, throttles, valves and functions illustrated between these working spaces are located in a rotationally symmetrical piston 6, so that one working space is arranged on the piston front side and the other working space is arranged on the piston rear side.

Four flow ducts 21 to 24 are provided for each flow direction inside the movable piston, that is to say between the working spaces. The first flow duct 21 in each case has a pilot-controlled main valve 27 consisting of a valve body 26 loaded by a spring 25. The second flow duct 22 in this case runs partially inside the first flow duct and has a throttle valve 28, here illustrated as a diaphragm or bore inside the valve body 26 of the main valve 27. In the actual version, this throttle valve is designed as a spring-loaded non-return valve, as described later. Furthermore, the second flow duct 22 contains a control valve 29. The control valve has as a valve body a slide 30, the closing or movement direction 31 of which is oriented essentially perpendicularly to the flow direction. The slide is spring-loaded here, but is adjusted counter to the spring 32 with the aid of an electromagnetic drive.

The air spring and damper unit has a parallel third flow duct 23 in which a permanently set uncontrolled throttle valve is arranged. This throttle valve 33 consists of a valve body 35 loaded by a spring 34. This gives rise to a permanently set hard damping characteristic in a throttle valve with regard to the respective flow direction, that is to say a "hard" safety setting.

Finally, a fourth flow duct 24 can be seen, along the run of which a bypass 36 formed by means of throttle bores is present, here inside the valve body 35. The damper hardness can thereby be preset.

Figure 3:
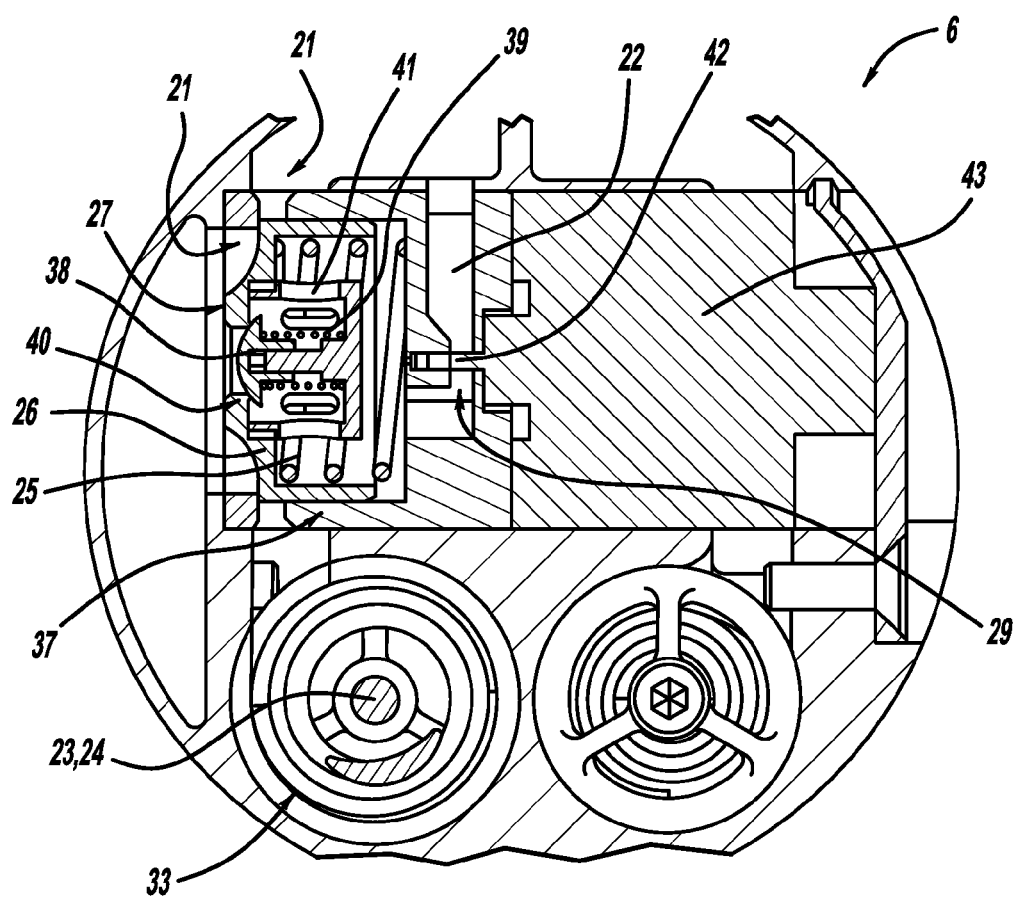
FIG. 3 shows a horizontal section A-A through a structural version according to the invention of a piston, as shown in FIG. 1, in detail.

FIG. 3, then, shows in detail a horizontal section through a structural version of a piston 6. Inside the movable piston 6, for each flow direction, a first flow duct 21 is present which has a pilot-controlled main valve 27 consisting of a valve body 26 loaded by a spring 25. The valve body 26 in this case is of pot-shaped design and is guided in a corresponding recess 37 of the piston. The helical spring/valve spring 25 is held and guided in the rear pot-shaped depression of the valve body 26 and is supported on the piston side against the bottom of the recess 37. The valve body 26 can thus be displaced counter to the spring pressure in the direction of the piston axis by medium pressure under specific conditions, so that the valve body 26 increasingly releases the flow duct 21.

The axis and movement direction of the valve body 26 and of the valve spring 25 of the main valve 27 are in this case arranged perpendicularly to the piston axis. In the design shown here, of course, the latter is perpendicular to the drawing plane (see the arrangement of the section A-A in FIG. 1).

The second flow duct 22 in each case runs partially, to be precise in the region located on the left side in FIG. 3, inside the first flow duct 21 and has a non-return valve 38 which is arranged inside the valve body 26 of the main valve 27. The non-return valve 38 is pressed by a valve spring 39 into its valve seat 40 on the inside, that is to say on the pot bottom of the valve body 26. The axis and movement direction of the non-return valve are likewise arranged perpendicularly to the piston axis and coaxially to the main valve.

The non-return valve 38 is in this case guided and held by a cage 41 which is screwed into the rear side of the main valve and is provided with passages and on which the spring 39 is also supported.

The control valve 29 in the flow duct 22 is in this case designed as an electrically driven slide 42, and the drive 43 of the control valve lies with its axis and direction of action perpendicularly to the piston axis and here in the axial direction of the main valve 27.

The main valve 27, non-return valve 38, control valve 42 and drive 43 of the control valve here lie along an axis and therefore require minimum construction space.

It is important that the valve body 26 of pot-shaped design is guided with as little friction as possible in the corresponding recess 37 of the piston, does not tilt and nevertheless is seated as air tight as possible in the recess. This is achieved by means of a careful setting of the fit and/or additional expert measures, such as easily running seals, sliding coatings (Teflon), etc.

Figure 4:
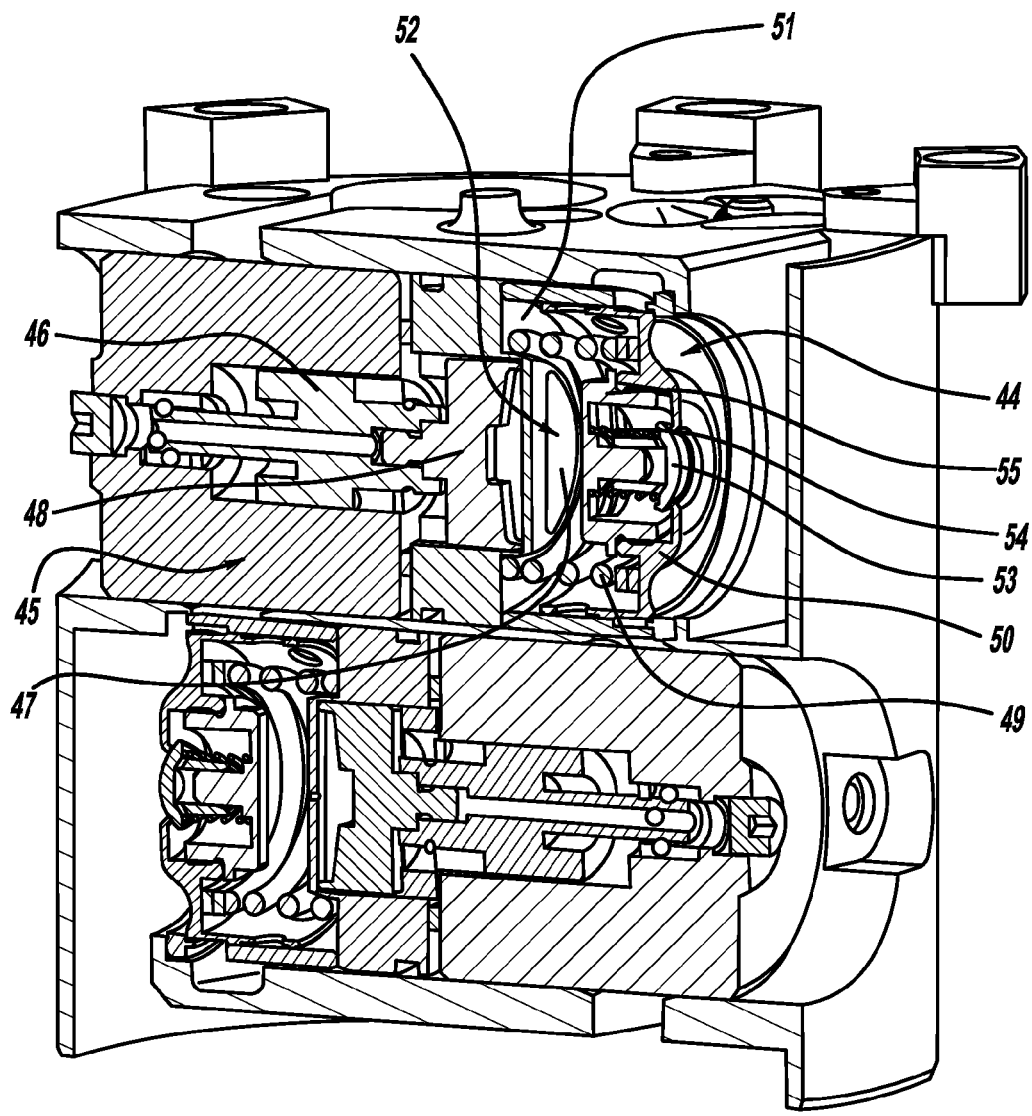
FIG. 4 shows a perspective vertical section through a piston of an air spring and damper unit according to the invention, as shown in FIG. 1, with a closed control valve.

FIG. 4 shows, for further illustration, a vertical section in perspective through a piston of an air spring and damper unit according to the invention, as shown in FIG. 1, with the control valve/control slide closed.

In this exceptionally space-saving and compact arrangement of all the flow ducts in the piston, in the upper part of the piston can be seen the flow regulating devices, arranged perpendicularly to the piston axis, for the compression stage, and those for the tension stage in the lower part of the piston. Both devices function in a basically and structurally identical way. For the sake of simplicity, therefore, only the devices for the compression stage are mentioned in FIG. 4, that is to say the devices which, for example, are actuated when the vehicle body drops into the spring suspension on account of road unevennesses. In this case, the piston moves upward, as is also clearly understandable from FIG. 1. The pressure of the medium is therefore then higher above the piston than below the piston.

In this version according to the invention, the regulation of the valve flows of the main valve 44 also takes place by means of a pilot control 45 arranged on the low-pressure side. The pilot control in this case contains the electromagnetically driven pilot control valve 46 which is arranged on the low-pressure side in the second flow duct 22 and which acts on the air flow in the same way as an adjustable throttle. As a result, a control pressure is generated between the two working spaces 2 and 3 in a third pressure space 47 located toward the low-pressure side and delimited by the main valve 44 and the pilot control valve or control slide 48. The theoretical lower limit of the control pressure is then the system pressure on the low-pressure side when the control valve is fully open and the upper limit is the system pressure on the high-pressure side when the pilot control valve is fully closed. The pilot control valve 46 in this case actuates a flat slide 48 which can open or close the associated flow duct perpendicularly to the piston axis.

The pilot-controlled main valve 44 consists of a valve body 50 loaded by a valve spring 49. Here, too, the valve body 50 is of pot-shaped design and is guided in a corresponding recess 51 of the piston. The valve spring 49 designed as a helical spring is held and guided in the rear pot-shaped depression of the valve body 50 and is supported on the piston side against the bottom of the recess 51.

Arranged inside the same flow duct between the two working spaces 2 and 3 and at the same time inside the valve body 50 of the main valve 44 is a non-return valve 52 which belongs functionally to the second flow duct which also contains the pilot control. The non-return valve 52 consists of a valve body 53 and is pressed by a spring 54 into its valve seat 54 onto a collar of the valve body 50 of the main valve. The axis and movement direction of the non-return valve are likewise arranged perpendicularly to the piston axis and coaxially to the main valve.

As long as the flat slide 48 of the pilot control valve 46 is closed, the pressures in the third pressure space 48 and in the high-pressure side working space 2 are identical, since equalization takes place via the non-return valve 52. However, as soon as a pressure difference occurs upstream and downstream of the main valve 44 due to the opening of the flat slide 48 and consequently due to a connection of the third pressure space 47 to the low-pressure side working space 3, said main valve is displaced counter to the spring pressure in the direction of the piston axis, so that the valve body 50 releases the flow duct.

Figure 5:
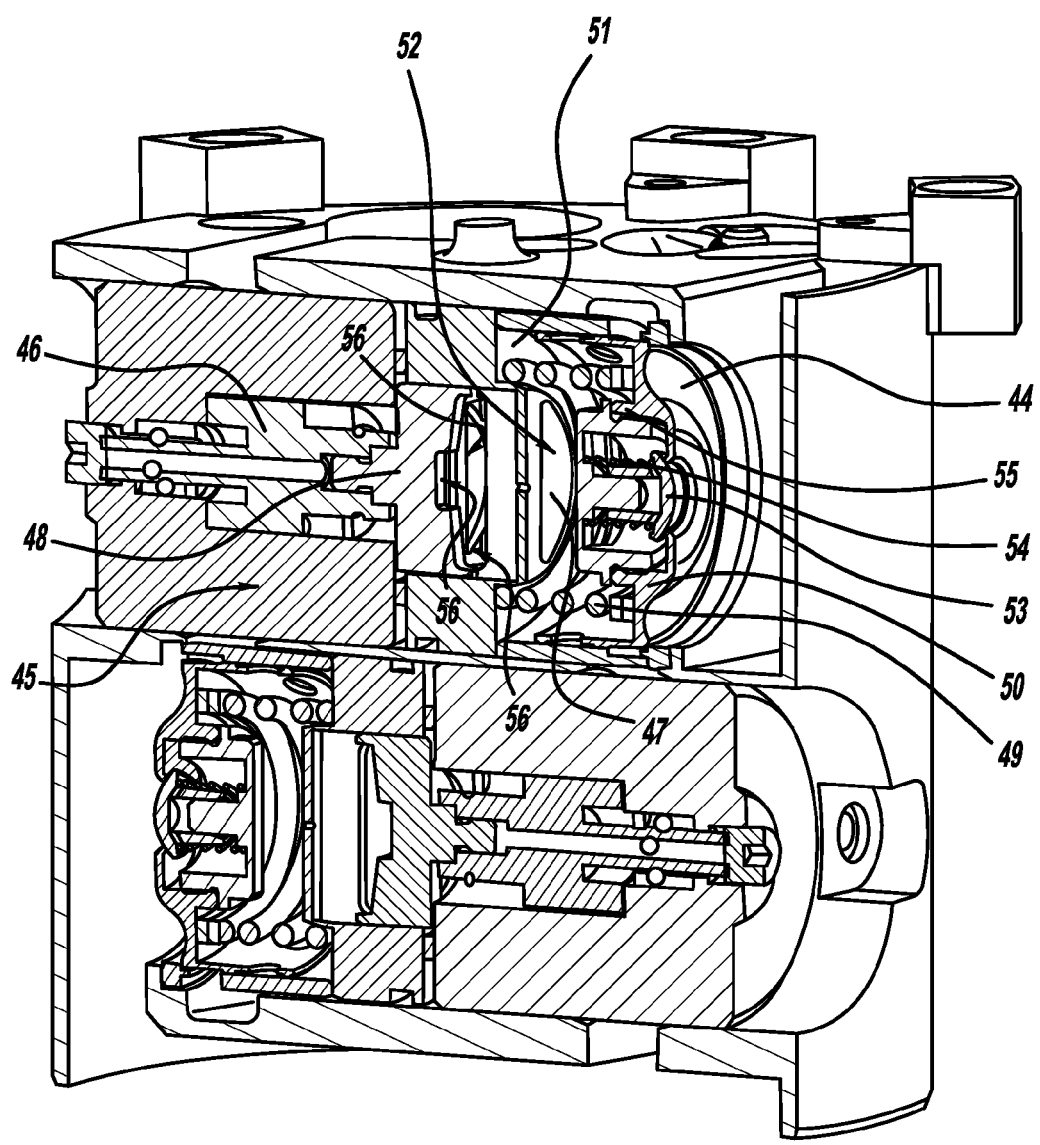
FIG. 5 shows a perspective vertical section through a piston of an air spring and damper unit according to the invention, as shown in FIG. 4, with an open control valve.

FIG. 5 shows once again a vertical section in perspective through a piston of an air spring and damper unit according to the invention, as shown in FIG. 4, but with an open flat slide 48 of the pilot control valve 46. There can also be seen clearly here the beveled steps formed on the front side 56 of the flat side 48, as a result of which the cross section to be opened by the pilot control valve changes nonlinearly in its area, to be precise increases nonlinearly during the opening of the slide and decreases nonlinearly during the closing of the latter.

Figure 6:
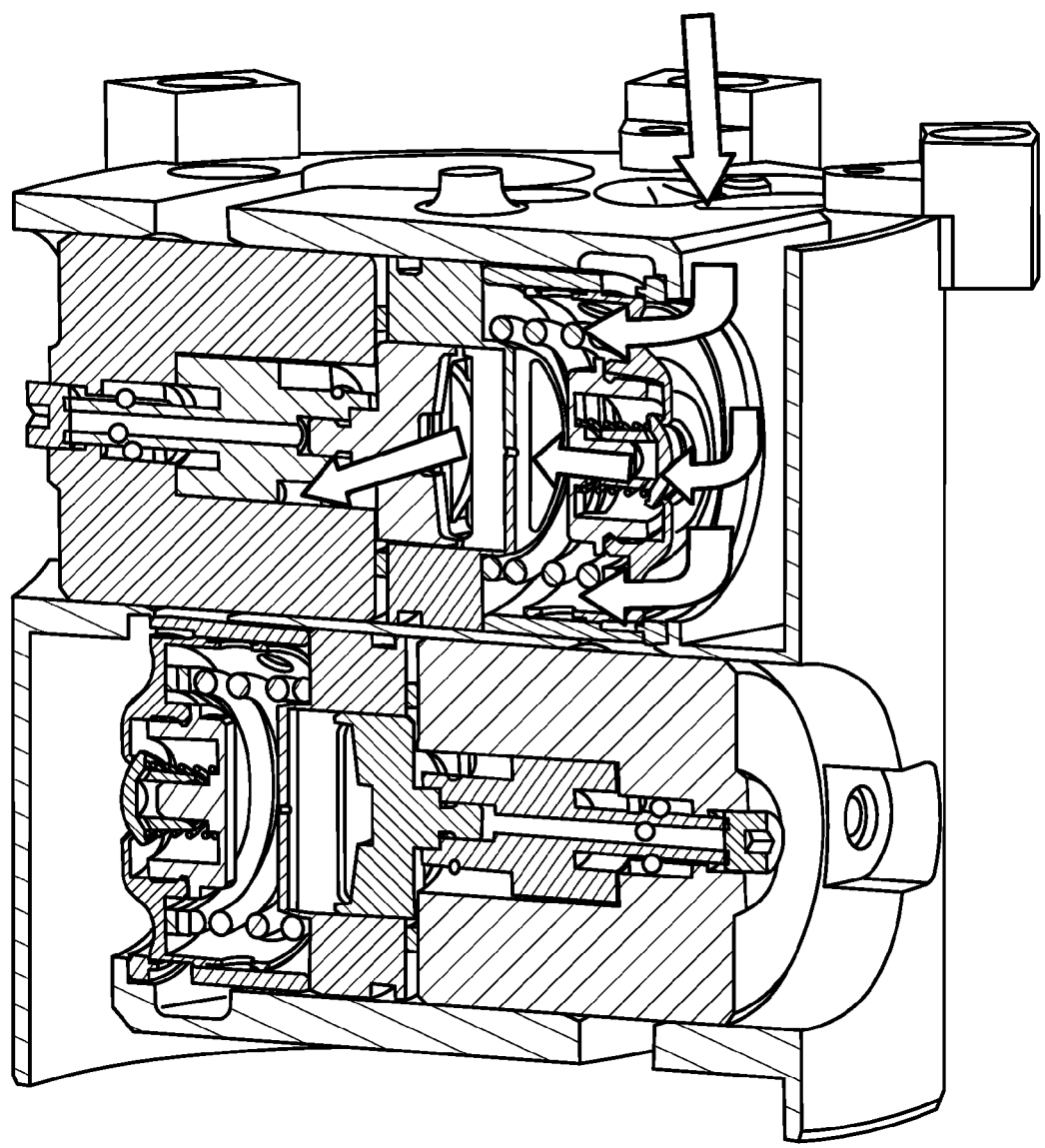
FIG. 6 shows by means of flow arrows a flow profile when the flat slide is open.

FIG. 6 shows, merely for illustration and without further reference symbols, by means of flow arrows the flow profile through the main valve 44 and the non-return valve 52, with the flat slide 48 open.

Figure 7:
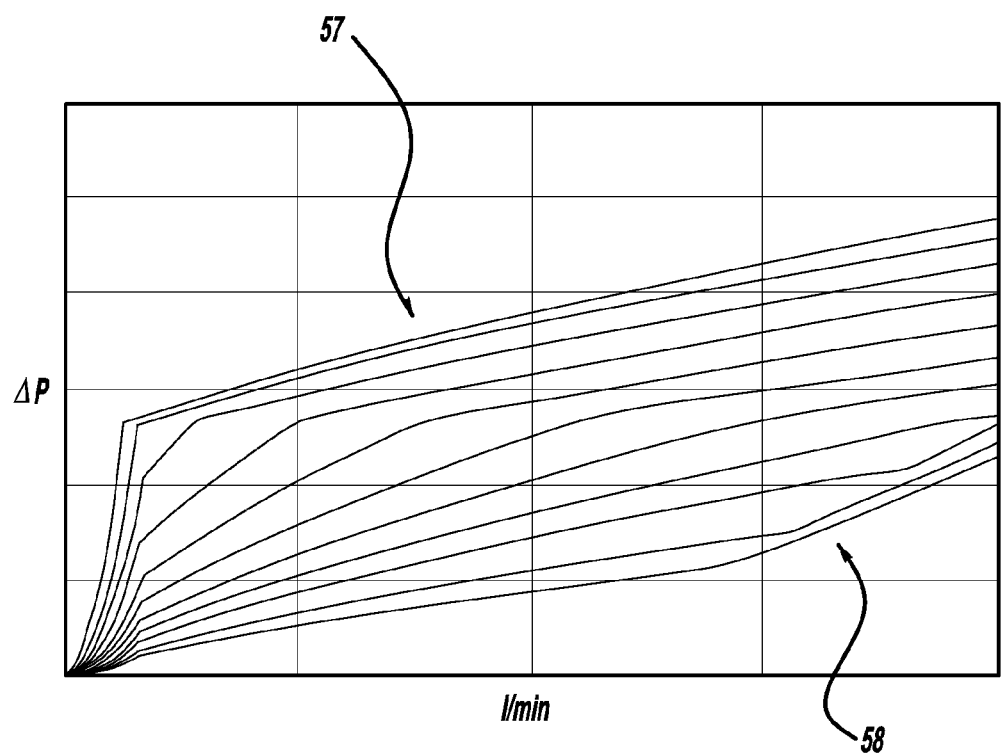
FIG. 7 shows a map of damping characteristic curves of the air spring and damper unit according to the invention.

FIG. 7 shows a map of damping characteristic curves, such as can be achieved by means of the air spring and damper unit according to the invention. Here, the pressure difference $\Delta P$ in bar (hectopascals) is plotted as a measure of the damping against the standard volume of flow in litres/min. In particular, the uniform distribution of the damping characteristic curves between the extremes becomes clear here, to be precise the characteristic curve 57 in the case of the hardest setting, with the pilot control valve closed, and the characteristic curve 58 in the case of a soft setting, with the pilot control valve fully open.

LIST OF REFERENCE SYMBOLS

Part of the Description

1 Air spring and damper unit
2 Working space/pressure space
3 Working space/working space
4 Housing
5 Piston rod
6 Piston
7 Roll-type bellows
8 Roll-type bellows
9 Roll-type bellows
10 Piston outer face
11 Piston outer face
12 Cylinder inner face
13 Connection point
14 Stop
15 Stop
16 Active roll-type bellows diameter
17 Active roll-type bellows diameter
18 Active roll-type bellows diameter
19 Rolling fold
20 Spring strut head bearing
21 Flow duct
22 Flow duct
23 Flow duct
24 Flow duct
25 Valve spring
26 Valve body
27 Main valve
28 Throttle valve
29 Control valve
30 Valve slide
31 Movement direction
32 Spring
33 Throttle valve
34 Valve spring
35 Valve body
36 Bypass
37 Recess
38 Non-return valve
39 Valve spring
40 Valve seat
41 Valve cage
42 Electrically driven slide
43 Drive of the control valve
44 Main valve
45 Pilot control
46 Pilot control valve
47 Third pressure space
48 Flat slide
49 Valve spring/helical spring
50 Valve body
51 Recess
52 Non-return valve
53 Valve body
54 Valve spring
55 Valve seat
56 Front side of the flat slide
57 Characteristic curve "hard"
58 Characteristic curve "soft"

The invention claimed is:

1. An air spring and damper unit for vehicles, comprising at least two pressure spaces filled with compressed air as a first and a second working space, a damper piston separating the first working space and the second working space from each other, a bellows at least partially delimiting one of the first and second working spaces,
a first set of flow ducts inside the damper piston controlling a first flow direction from the first working space to the second working space and a second set of flow ducts controlling a second flow direction from the second working space to the first working space,
each of the first and second set of flow ducts comprising a first, a second, a third, and a fourth flow duct, wherein a first controllable throttle valve is arranged in the first flow duct of the first set of flow ducts and is designed as a pilot-controlled main valve which opens in the first flow direction and which can be acted upon from the second working space with a control pressure, and the second set of flow ducts comprising a second controllable throttle valve disposed in the first flow duct of the second set of flow ducts, the second controllable throttle valve being designed as a pilot-controlled main valve opening in the second flow direction and controllable with a control pressure from the first working space,
the damper piston having a piston axis, each of the throttle valves having an axis and movement direction in parallel relationship to each other and perpendicular to the piston axis,
wherein the damper piston is a rotationally symmetrical piston axially movable inside a rotationally symmetrical housing and with a rear side located at a head end of a piston rod, one of the working spaces being arranged on a piston front side opposite the piston rod and the other one of the working spaces is arranged on the piston rear side,
wherein in both sets of flow ducts the axis and movement direction of the respective main valve is perpendicular to the piston axis, the axis and movement direction of a respective non-return valve in the respective second flow duct is perpendicular to the piston axis and coaxial to the main valve, and a respective control valve for controlling a pilot pressure of the respective main valve has an axis and direction of action perpendicular to the piston axis and parallel to or in the axial direction of the respective main valve.

2. The air spring and damper unit as claimed in claim 1, wherein the main valve, the control valve and a drive of the control valve for each flow direction are arranged along a common axis.

3. The air spring and damper unit as claimed in claim 2, wherein a valve body of each of the main valves is of pot-shaped design and is guided in a respective recess complementary to an outer geometry of the valve body, the respective recess being in the damper piston,
wherein the air and spring damper unit further comprises a helical spring arranged on a rear side of each of the main valves pressing each of the main valves into an associated valve seat, and each of the helical springs being guided in the pot-shaped depression of each of the valve bodies and being supported on the piston side against a bottom of the respective recess.

4. The air spring and damper unit as claimed in claim 3, wherein each of the control valves have a cross section to be opened by the control valve, wherein the cross-sectional area changes non-linearly when the control valve is opened.

5. The air spring and damper unit as claimed in claim 4, wherein each of the control valves are designed as a flat slide which influences the cross section of a flow duct and has a front side with stepped and beveled setbacks.

* * * * *